US007493567B2

(12) United States Patent
Ollis et al.

(10) Patent No.: US 7,493,567 B2
(45) Date of Patent: Feb. 17, 2009

(54) METHOD AND SYSTEM FOR PINNING CONTACTS AND ITEMS

(75) Inventors: Joseph Kirk Ollis, Kirkland, WA (US); Darron Jack Stepanich, Seattle, WA (US); Marc W. Todd, Redmond, WA (US); David W. Flynt, Lake Forest Park, WA (US); Henry Chen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 10/767,463

(22) Filed: Jan. 28, 2004

(65) Prior Publication Data

US 2005/0166157 A1    Jul. 28, 2005

(51) Int. Cl.
*G06F 3/01* (2006.01)
(52) U.S. Cl. ...................................... 715/758
(58) Field of Classification Search .................. 715/758
See application file for complete search history.

(56) References Cited

U.S. PATENT DOCUMENTS

| 5,396,264 | A | 3/1995 | Falcone et al. ............... 715/811 |
| 6,526,274 | B1 * | 2/2003 | Fickes et al. .............. 455/414.1 |
| 6,624,831 | B1 | 9/2003 | Shahine et al. .............. 715/815 |
| 7,124,123 | B1 * | 10/2006 | Roskind et al. ............... 706/60 |
| 2002/0167538 | A1 | 11/2002 | Bhetanabhotla ............. 715/700 |
| 2004/0056901 | A1 * | 3/2004 | March et al. ................. 345/811 |
| 2004/0093387 | A1 * | 5/2004 | Wick .......................... 709/207 |
| 2005/0027382 | A1 * | 2/2005 | Kirmse et al. ................. 700/91 |

FOREIGN PATENT DOCUMENTS

EP    1 286 253 A2    2/2003

OTHER PUBLICATIONS

Screen Dumps of Microsoft Outlook (1999, pp. 1-12).*
J. Trevor et al., "Contextual Contact Retrieval", International Conference on Intelligent User Interfaces, Proceedings of the 9th International Conference on Intelligent User Interface, pp. 337-339, Jan. 13-16, 2004.
B. Kerr et al., "Designing Remail: Reinventing the Email Client Through Innovation and Integration", CHI 2004/Design Case Study, pp. 837-852, Apr. 24-29, 2004.
B. Nardi et al., "Integrating Communication and Information Through Contact Map", Communications of the ACM, vol. 45, No. 4, pp. 89-95, Apr. 2002.
S. Whittaker et al., "Contact Management: Identifying Contacts to Support Long-Term Communication", Computer Supported Cooperative Work, Proceedings of the 2002 ACM Conference on Computer Supported Cooperative Work, pp. 216-225, Nov. 16-20, 2002.
I. S. MacKenzie et al., "LetterWise: Prefix-based Disambiguation for Mobile Text Input", CHI 2001, vol. 3, No. 2, pp. 111-120, Nov. 11-14, 2001.

* cited by examiner

*Primary Examiner*—David Wiley
*Assistant Examiner*—Le Nguyen
(74) *Attorney, Agent, or Firm*—Merchant & Gould, P.C.

(57) ABSTRACT

The present invention provides a method and system of pinning and displaying pinned items. Pinned items are displayed such that they are visually distinguishable and prioritized higher than related non-pinned items. For example, pinned contacts are displayed at the top of the contact list and are visually distinguishable from the other contacts. A special icon is used to show an item that is "pinned." contact. A pinned item is a copy of a contact. The copy helps a user quickly access the items they most commonly communicate with and use and provides an importance to an item.

17 Claims, 9 Drawing Sheets

METHOD AND SYSTEM FOR PINNING CONTACTS AND ITEMS

BACKGROUND OF THE INVENTION

Personal information managers such as in PDAs and cell phones typically maintain lists of contacts. These contact lists store information about each contact including items, such as: name, job title, company name, business number, home number, fax number, mobile number, email addresses, web pages, and the like. The contact lists can become very long. For example, some contact lists may include everyone in a large company. Finding contacts within these contact lists can be difficult. It can also be difficult to locate other items on the computer. For example, it may be difficult to find a folder within a large file system, or locate a field within a file. What is needed is a way to easily access important contacts and items on a device.

SUMMARY OF THE INVENTION

The present invention is directed towards providing a method and system for pinning items and displaying pinned items on a device. According to one aspect of the invention, the user "pins" items that are important to them. The pinned items are displayed at the top of their respective list. For example, when a pinned item is a contact, then the pinned contact is displayed at the top of the contact list. When the pinned item is a folder, then the pinned folder is displayed before non-pinned folders. Similarly, when a field within a file is pinned then the pinned item is displayed before the non-pinned items. A special icon may be placed with the item showing it is a "pinned" contact and visually distinguishing it from the non-pinned items.

According to another aspect of the invention, the pinned items are visually distinguishable from non-pinned items. A special icon may be placed with the pinned item showing it is "pinned.".

According to another aspect of the invention, a pinned item is a copy of the item. For example, a pinned contact is a copy of the contact. The copy helps a user quickly access the items they most commonly communicate with and use. An importance to the item is also provided by showing the pinned items at the top of their respective list.

DETAILED DESCRIPTION OF THE PREFERRED EMBODIMENT

The present invention is directed towards providing "pinned" items to simplify the core device communication experience. The pinned items help to provide quick access to the important or commonly communicated contacts and items. The user can assign an importance to an or item by "pinning" the item. The pinned items are displayed at the top of their respective list.

Illustrative Operating Environment

Figure 1:
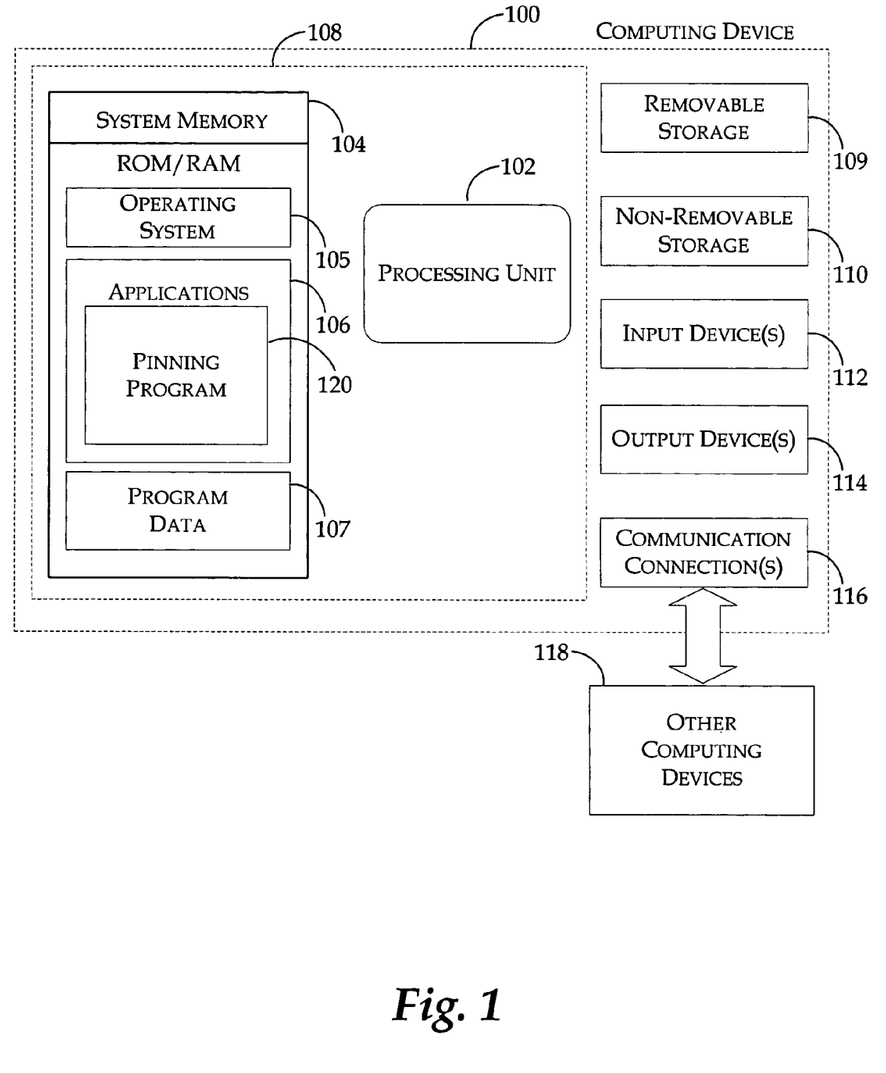
FIGS. 1 and 2 illustrate exemplary computing devices that may be used according to exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a pinning application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
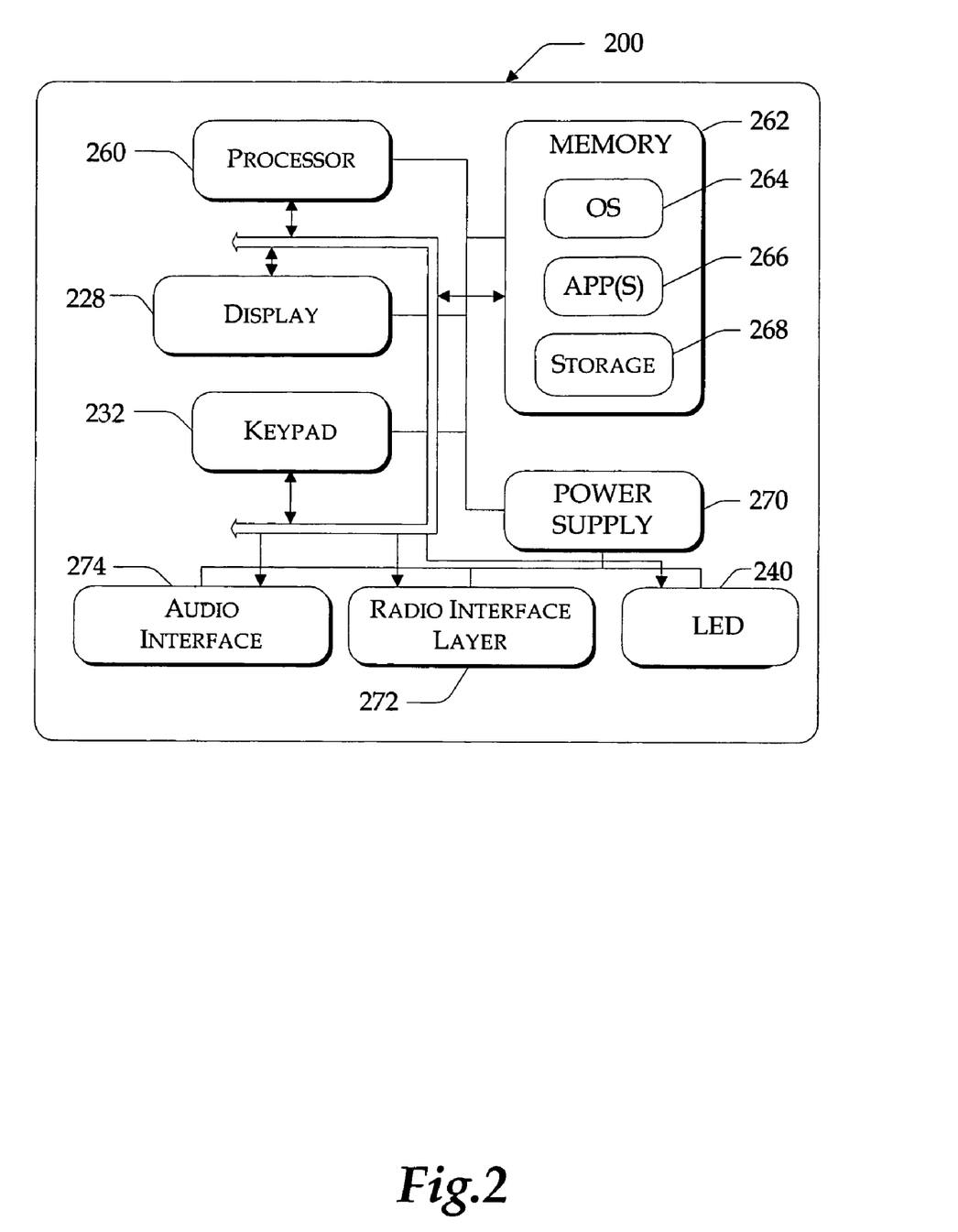

FIG. 2 illustrates a mobile computing device that may be used according to an exemplary embodiment of the present invention. Mobile computing device 200 includes processor 260, memory 262, display 228, and keypad 232. Memory 262 generally includes both volatile memory (e.g., RAM) and non-volatile memory (e.g., ROM, Flash Memory, or the like).

Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then could also act as an input device.

One or more application programs 266 are loaded into memory 262 and run on the operating system 264. A pinning application resides on mobile computing device 200 and is programmed to provide operations relating to a pinned contact operation and a pinned item operation. The pinning application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes wireless interface layer 272 that performs the function of transmitting and receiving wireless communications. The wireless interface layer 272 facilitates wireless connectivity between the mobile computing device 200 and the outside world. According to one embodiment, transmissions to and from the wireless interface layer 272 are conducted under control of the operating system 264. In other words, communications received by wireless interface layer 272 may be disseminated to application programs 266 via operating system 264, and vice versa.

Pinned Items

The user "pins" the contacts and items that are important to them. The pinned contacts and items are displayed at the top of their list and are visually distinguishable from the other non-pinned contacts and non-pinned items. A special icon may be placed with the contact or item showing that it is "pinned." For example, when a pinned item is a folder then the pinned folder is displayed before non-pinned folders. Similarly, when a field within a file is pinned then the pinned item is displayed before the non-pinned items. A user may also pin an application to place it at the top of a list. For example, a user may pin an application on their home screen to distinguish it from other available applications.

Figure 3:
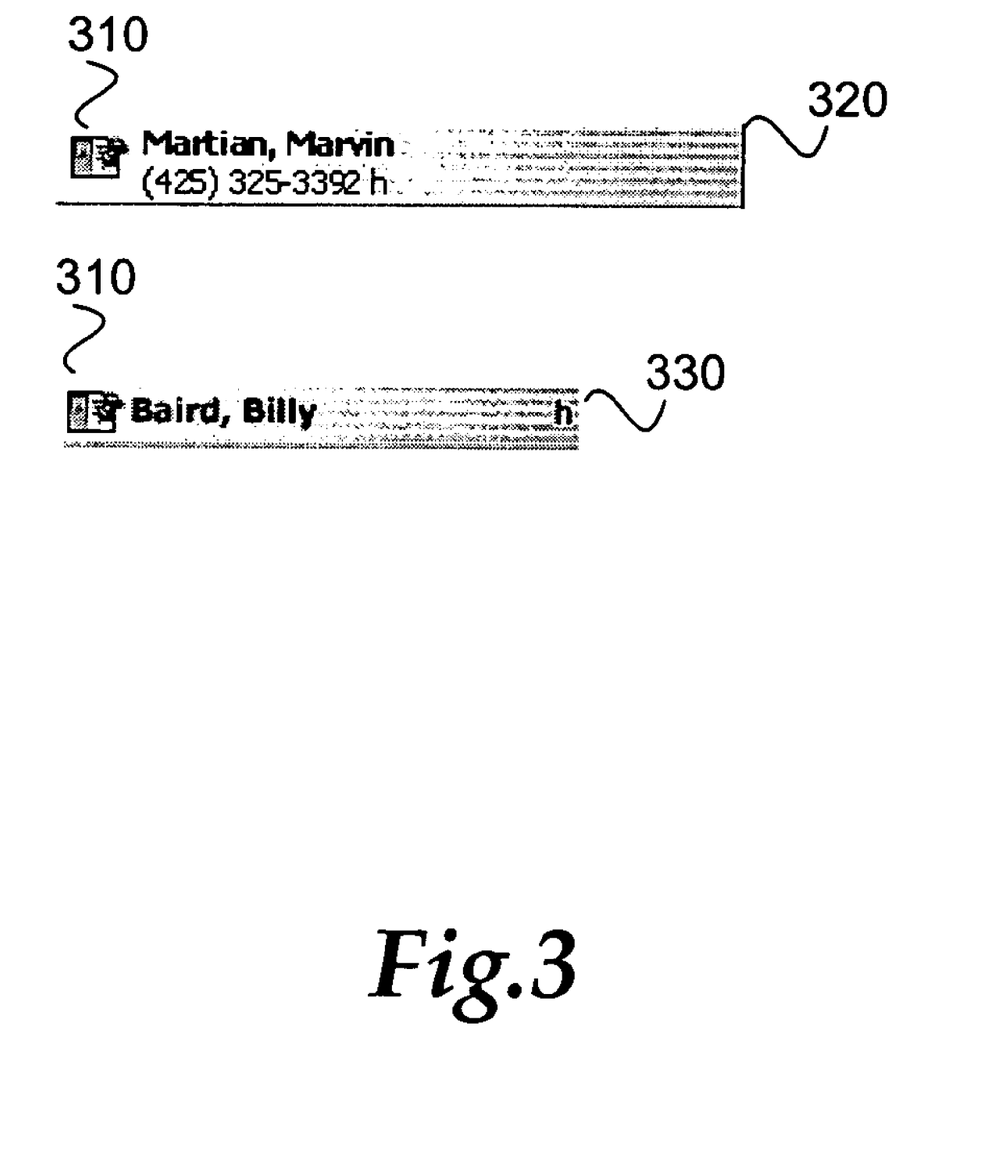
FIG. 3 illustrates exemplary pinned contacts.

FIG. 3 illustrates exemplary pinned contacts, in accordance with aspects of the invention. Pinned items simplify the core device communication experience by providing quick access to the commonly communicated contacts and items. The pinned items allow a user to assign an importance an item by "pinning" that item. According to one embodiment, items may be pinned before a user receives the device. For example, an OEM partner may automatically create a pinned contact for "help" with the device.

According to one embodiment, a visual cue is used to help in distinguishing pinned items from non-pinned items. According to one embodiment, a pinned icon (310) replaces the contact icon which is displayed next to the name in a list view for the contacts. Other indicators may be used to distinguish a pinned items from a non-pinned items.

As illustrated, pinned contact 330 shows the contacts name, whereas pinned contact 320 includes a telephone number in addition to their name. Different views may be shown depending on the device capabilities. For example, pinned contact 330 may be used on a device with limited display area, as compared to pinned contact 320.

Figure 4:
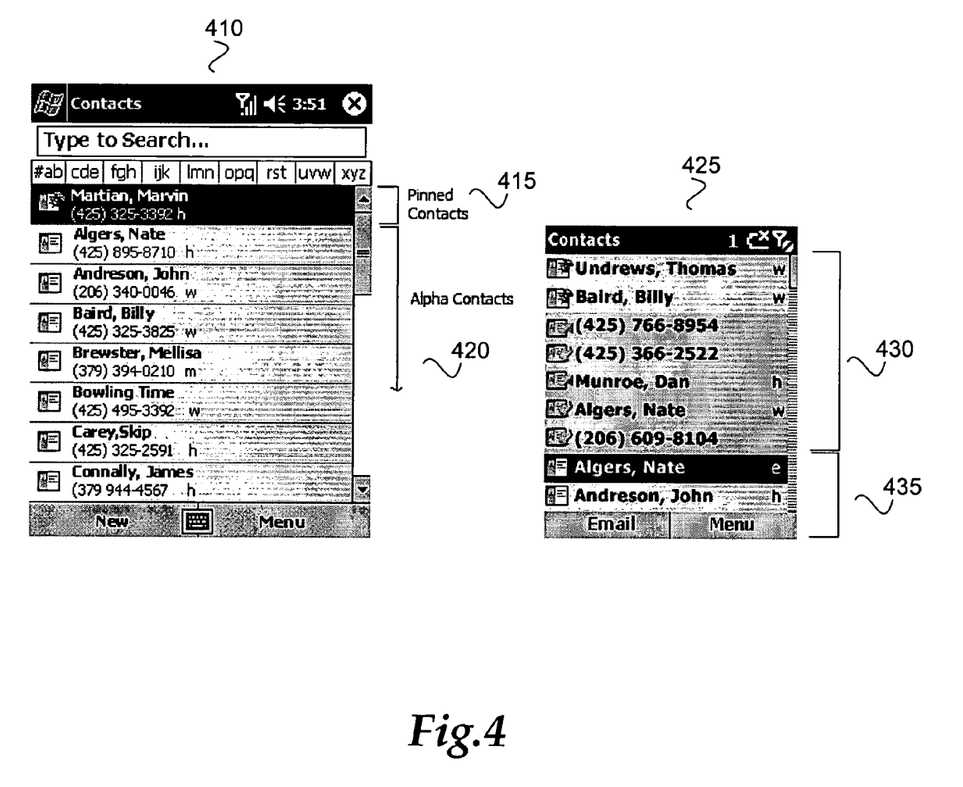
FIG. 4 shows exemplary displays of contact lists including pinned contacts.

FIG. 4 shows exemplary displays of contact lists including pinned contacts, in accordance with aspects of the invention.

As can be seen, pinned contacts are displayed at the top of the contact lists 415 and 430. While there is no limit to the number of pinned contacts a user can create, the usefulness of the pinned contacts decreases as the number of pinned contacts increases. The usefulness decreases since the user would have to navigate through more of these pinned contacts. Typically, the user would not have more than one screen of pinned contacts.

Contact list 410 shows pinned contact 415 followed by an alphabetical listing of non-pinned contacts (420). Contact list 425 shows another view of pinned contacts 430 followed by an alphabetical listing of non-pinned contacts 435. As can be seen, the Pinned Contacts (415 and 430) are kept at the top of the contact list.

Figure 5:
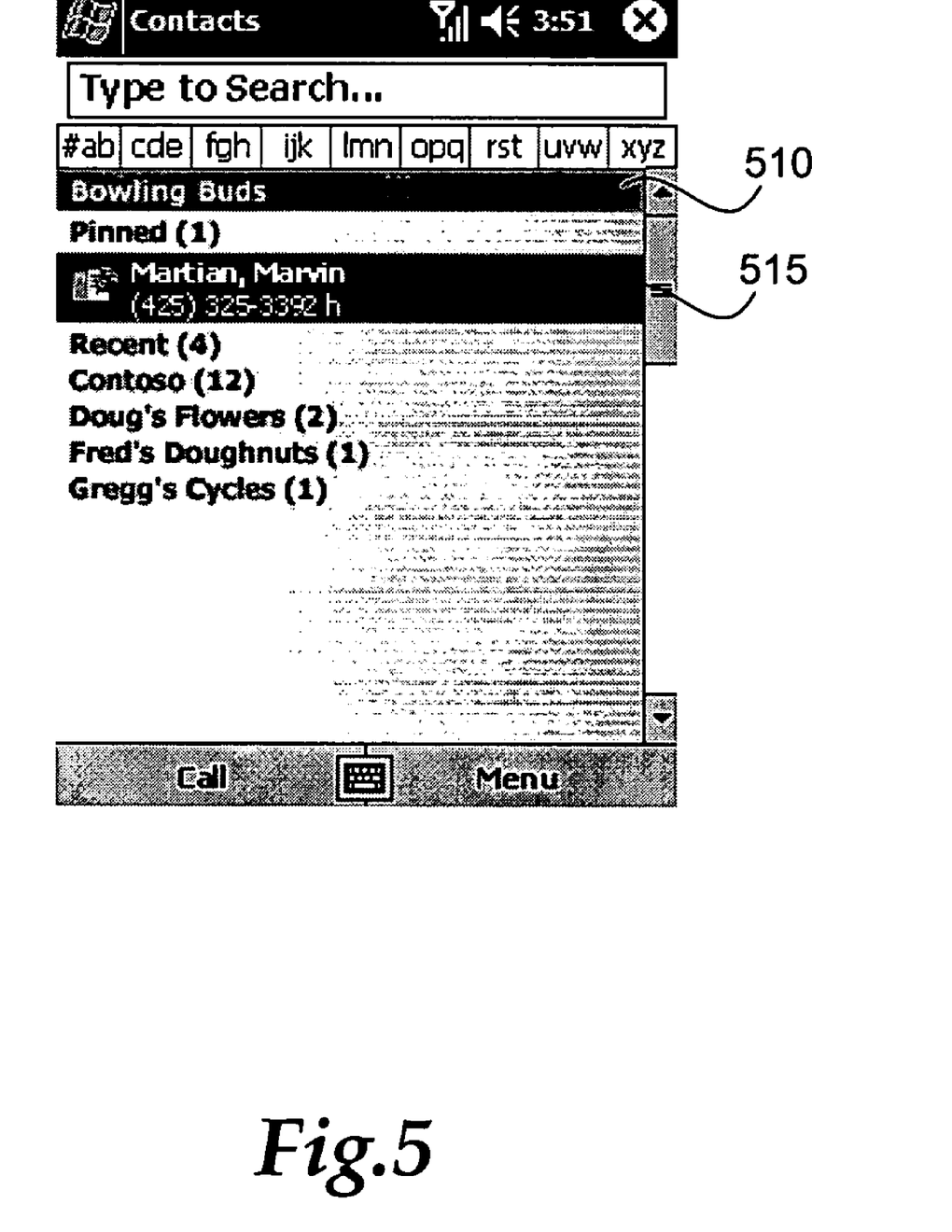
FIG. 5 illustrates an exemplary display showing a company contact view.

FIG. 5 illustrates an exemplary display showing a company contact view, in accordance with aspects of the invention.

When a user views a particular category while viewing the contact list ordered by company, the display is filtered accordingly. According to one embodiment, only the pinned items that belong to the selected category or data source are shown in the view. Alternatively, all of the pinned contacts may be shown. As illustrated, pinned contact 515 is the only pinned contact under the bowling buds view (510).

Figure 6:
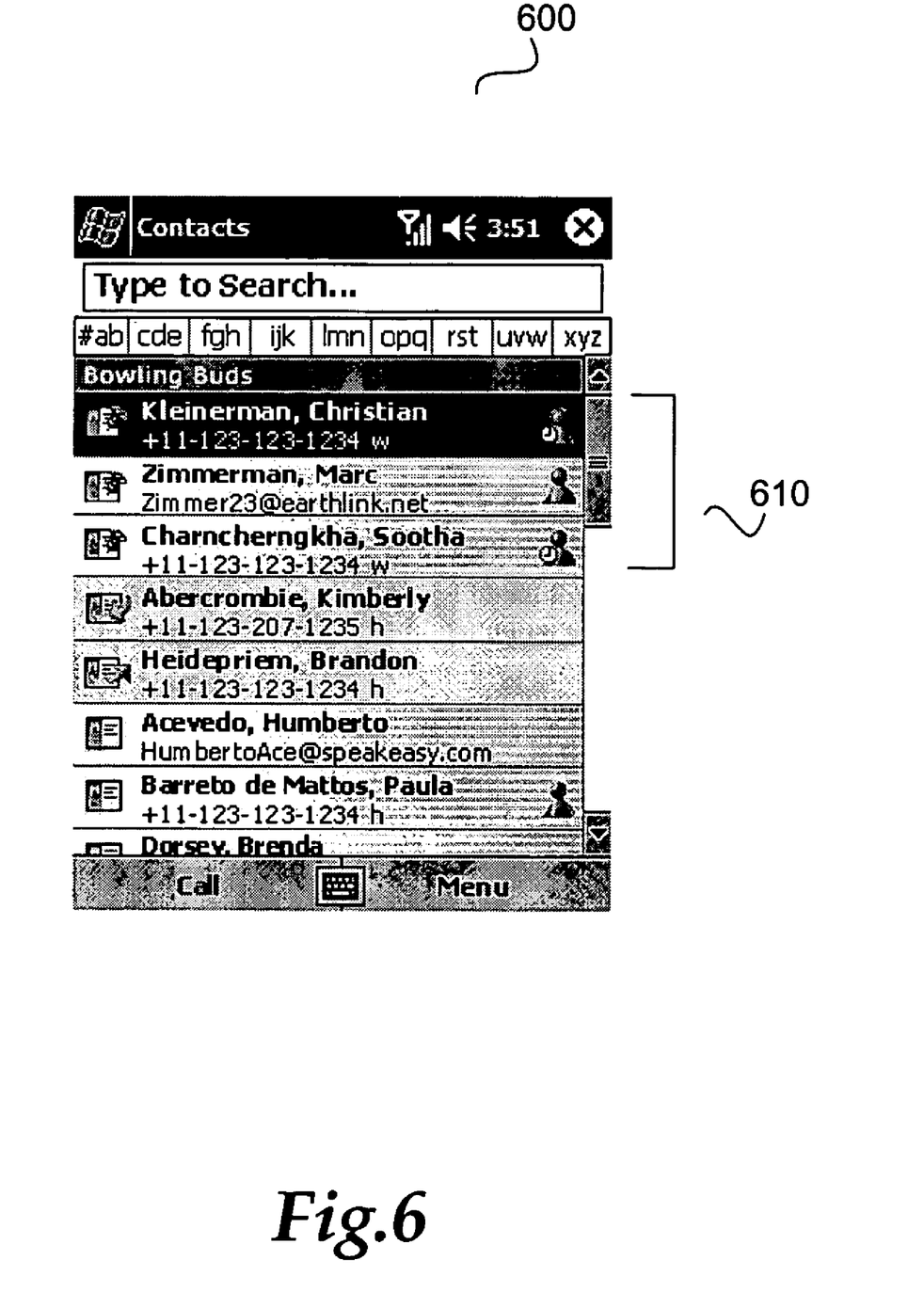
FIG. 6 illustrates an exemplary category view of contacts.

FIG. 6 illustrates an exemplary category view of contacts, in accordance with aspects of the invention.

As illustrated, contact list 600 shows a category view for bowling buddies that includes pinned contacts 610. According to one embodiment, pinned contacts 610 are the pinned contacts for the selected category. Pinned contacts 610, however, may include more of the pinned contacts from the other categories.

Figure 7:
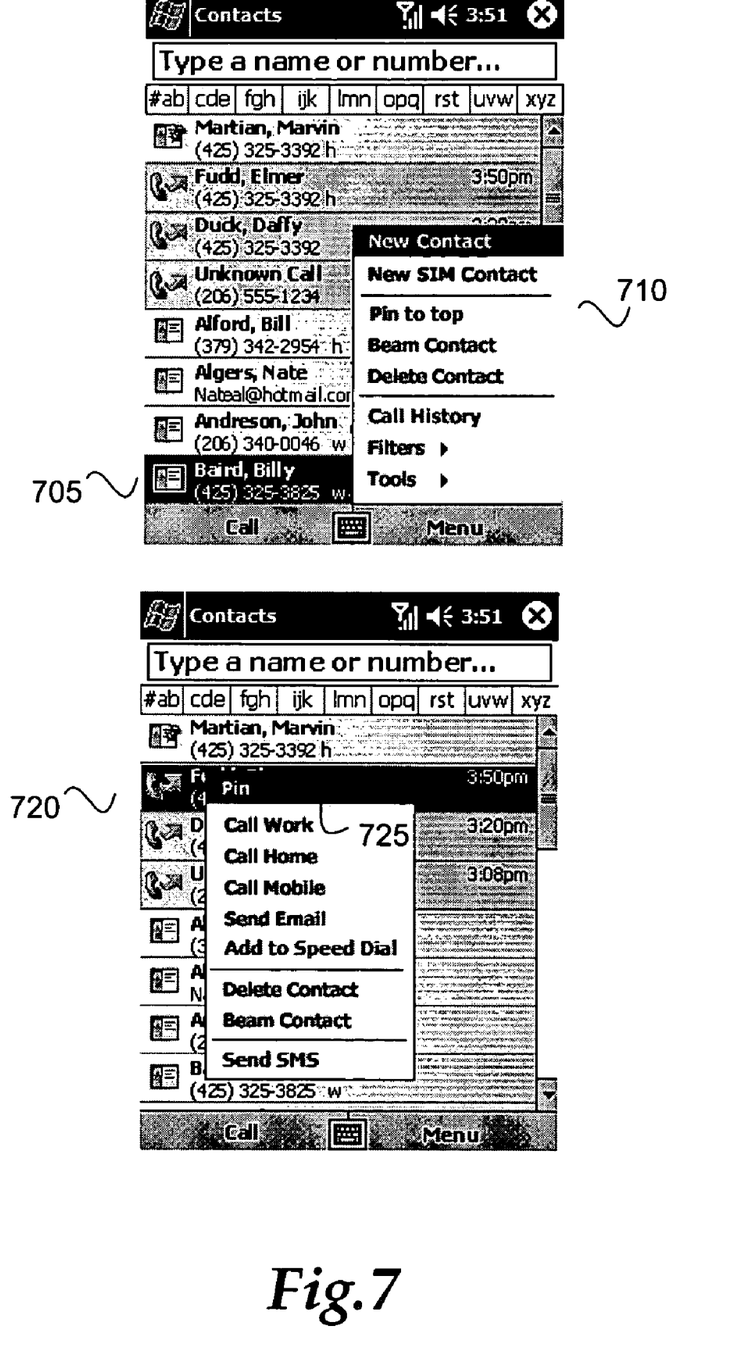
FIG. 7 shows creating a pinned contact.

FIG. 7 shows creating a pinned contact, in accordance with aspects of the invention.

According to one embodiment, the user selects a contact within their contact list to pin and then selects the menu option to pin the contact. With focus on the contact (705) desired to be pinned, the user selects the "Pin to top" option (710) in the menu. Once the pin menu option is selected, a copy of the contact will appear in the pinned contacts section of the contact list.

To pin a contact from a recent call menu, the user selects the recent call (720) and selects the pin option in the menu (725). When the user Pins a contact to the top of the list, the contact is copied to the top of the list below the other pinned contacts, and focus is put on the newly pinned contact. Contacts may be pinned anywhere a contact may be accessed. For example, the contact may be pinned from the contact list, from a recent call list, from a summary card, and the like.

Figure 8:
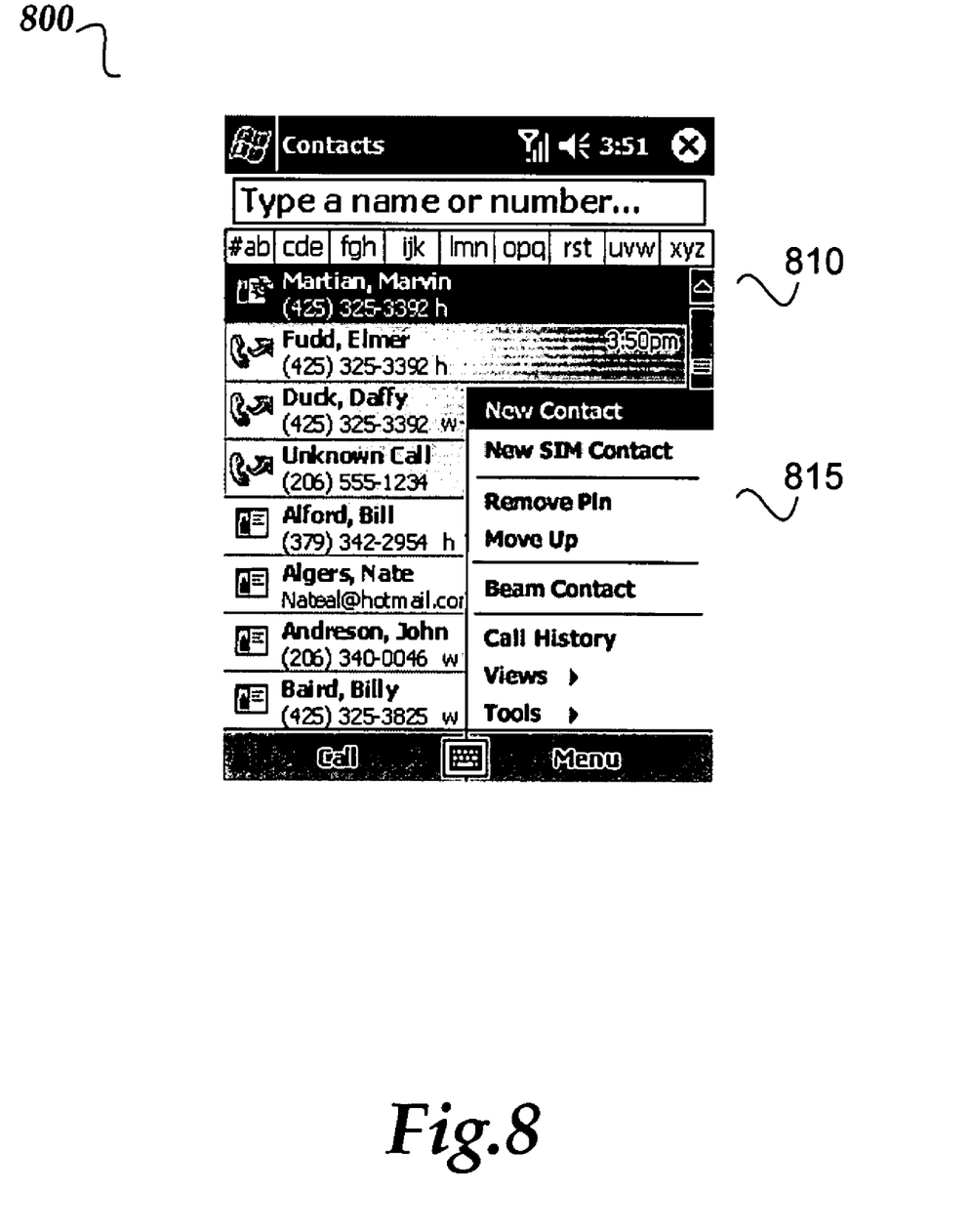
FIG. 8 shows an exemplary screen shot of a contacts list showing how to manage pinned contacts.

A person may from the summary card of the contact designate a default communication method to be shown in the Contact List view and other instances of the pinned view. FIG. 8 shows an exemplary screen shot of a contacts list showing how to manage pinned contacts, in accordance with aspects of the present invention.

Contact list 800 includes pinned contact 810. With the focus on the desired pinned contact, such as pinned contact 810, menu 815 appears that allows the user to manage the pinned contact. According to one embodiment, the options include, removing the pin and moving the pin.

For an item that is pinned to the top of the list, the 'Pin to top' option in the menu becomes 'Remove Pin'. According to one embodiment, removing a pinned contact removes the pinned contact but does not remove the unpinned contact. An option could be added to allow removal of the pinned contact to remove the actual contact located within the contact list. If a user deletes the contact within the unpinned contact list corresponding to the pinned contact, the pinned contact is automatically removed from the pinned list.

The user can move a pinned contact higher in the pinned contact list by selecting 'Move up' from menu 815. The user can move a pinned contact down in the pinned list by selecting 'Move down' from menu 815. If the contact is already at the top of the list, the move up option is grayed out. Similarly, if the contact is already at the bottom of the pinned item list, the move down option is grayed out.

According to one embodiment, selecting to beam the contact from menu 815 beams the corresponding unpinned contact. In other words, the categorization of the contact as pinned will not be beamed to the other device.

Figure 9:
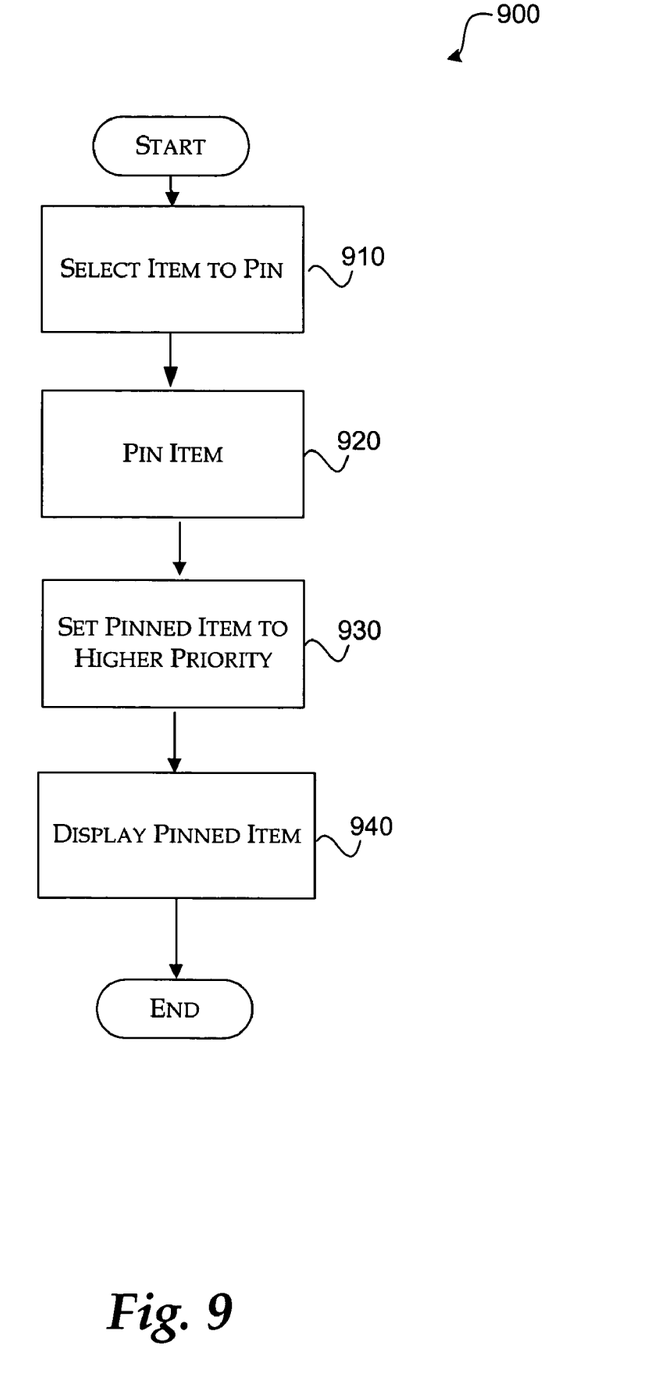
FIG. 9 illustrates a process for pinning items, in accordance with aspects of the invention.

FIG. 9 illustrates creating a pinned item in accordance with aspects of the invention. After a start block, the process 900 flows to block 910 where the user selects the item to pin. While the above examples illustrate pinning a contact, the item selected to pin may be any item on the device that may be distinguished from other items. For example, a user may pin a file or folder within the file system. The user may also pin a field within a file. For example, a user could pin the mobile telephone number field within a contact. The user could also pin an application. Another example would be pinning an email message. Flowing to block 920, the item is pinned. Pinning the item associates an importance with the item such that a user can easily find the pinned items.

Next, at block 930 the pinned item is prioritized higher than the non-pinned items. For example, a pinned folder would have a higher display priority than the non-pinned folders. Similarly, a pinned field within a contact is prioritized higher than the non-pinned fields within the contact.

Moving to block 940, the pinned item is displayed. The pinned item is displayed such that it is visually distinguishable from the non-pinned items. For example, a pinned folder is displayed at the top of the folder list and includes a visual indication that it is pinned. Similarly, a pinned email message within a user's inbox is displayed at the top of the list of emails. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for pinning and displaying items, comprising:
   selecting an item to pin;
   pinning the item selected by a user;
   automatically creating a copy of the item selected to pin; and
   automatically displaying the pinned item before non-pinned items such that the pinned item is distinguishable from and prioritized higher than related non-pinned items.

2. The method of claim 1, wherein displaying the pinned item further comprises including a visual indicator indicating that the item is pinned.

3. The method of claim 1, wherein the item to pin is selected from a group comprising a contact, a folder, a file, a field, an application, and a message.

4. The method of claim 1, wherein displaying the pinned item such that the pinned item is distinguishable and prioritized higher than the related non-pinned items further comprises displaying the pinned item at a top of a list view.

5. The method of claim 4, further comprising displaying the pinned item with a category view when it is associated with a category.

6. The method of claim 3, further comprising managing pinned items such that the pinned item may be moved relative to other pinned items.

7. The method of claim 6, wherein managing the pinned items further comprises deleting a pinned item.

8. The method of claim 7, wherein deleting the pinned item further comprises keeping a corresponding item within an unpinned item list.

9. A system for representing items, comprising:
   a display configured to display items; and
   a pinned items application that is configured to perform the following actions, including:
      pinning an item selected by a user;
      automatically create a copy of the item selected to pin to be used as the pinned item; and
      automatically instructing the display to display the pinned item before non-pinned items such that the pinned item is distinguishable and prioritized higher than related non-pinned items.

10. The system of claim 9, wherein the pinned item includes an icon indicating that it is pinned.

11. The system of claim 9, wherein instructing the display to display the pinned item, further comprises displaying the pinned item only when it is associated with a category view currently being displayed.

12. The system of claim 9, wherein the pinned item application is further configured to manage pinned items.

13. The system of claim 11, wherein managing the pinned items further comprises moving the pinned items within the pinned items list.

14. The system of claim 12, wherein managing the pinned items further comprises deleting at least one of the pinned items.

15. A computer-readable storage medium for displaying items, comprising:
   selecting an item to pin;
   pinning the item selected by a user;
   automatically creating a copy of the contact item to pin, wherein the copy is used as the pinned item; and
   automatically displaying the pinned item before non-pinned items such that the pinned item is distinguishable and prioritized higher than related non-pinned items.

16. The computer-readable medium of claim 15, wherein displaying the pinned item further comprises including an icon indicating that the item is pinned.

17. A computer-readable medium of claim 15, wherein displaying the pinned item, further comprises displaying the pined item at a top of a list view.

* * * * *

UNITED STATES PATENT AND TRADEMARK OFFICE
CERTIFICATE OF CORRECTION

| | | |
|---|---|---|
| PATENT NO. | : 7,493,567 B2 | Page 1 of 1 |
| APPLICATION NO. | : 10/767463 | |
| DATED | : February 17, 2009 | |
| INVENTOR(S) | : Joseph Kirk Ollis et al. | |

It is certified that error appears in the above-identified patent and that said Letters Patent is hereby corrected as shown below:

In column 6, line 65, in Claim 17, delete "pined" and insert -- pinned --, therefor.

Signed and Sealed this

Third Day of May, 2011

David J. Kappos
*Director of the United States Patent and Trademark Office*